United States Patent
Xiao et al.

(10) Patent No.: US 12,463,267 B2
(45) Date of Patent: Nov. 4, 2025

(54) DIRECT RECYCLING AND CONVERTING CATHODE MATERIALS INTO HIGH-PERFORMANCE SINGLE CRYSTAL CATHODE MATERIALS

(71) Applicant: Battelle Memorial Institute, Richland, WA (US)

(72) Inventors: Jie Xiao, Richland, WA (US); Ran Yi, Richland, WA (US); Bingbin Wu, Richland, WA (US); Yujing Bi, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 93 days.

(21) Appl. No.: 17/974,022

(22) Filed: Oct. 26, 2022

(65) Prior Publication Data

US 2024/0145801 A1 May 2, 2024
US 2024/0356096 A9 Oct. 24, 2024

(51) Int. Cl.
| | |
|---|---|
| *H01M 10/54* | (2006.01) |
| *C01G 53/50* | (2025.01) |
| *H01M 4/36* | (2006.01) |
| *H01M 4/505* | (2010.01) |
| *H01M 4/525* | (2010.01) |
| *H01M 4/02* | (2006.01) |

(52) U.S. Cl.
CPC .......... *H01M 10/54* (2013.01); *C01G 53/50* (2013.01); *H01M 4/364* (2013.01); *H01M 4/505* (2013.01); *H01M 4/525* (2013.01); *C01P 2002/50* (2013.01); *C01P 2002/72* (2013.01); *C01P 2004/03* (2013.01); *C01P 2006/40* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 2016/0251740 A1* | 9/2016 | Bi ................ | B22F 9/04 |
| | | | 75/353 |
| 2019/0273290 A1* | 9/2019 | Sloop .............. | H01M 4/525 |
| 2021/0351404 A1 | 11/2021 | Xiao et al. | |
| 2022/0112094 A1 | 4/2022 | Xiao et al. | |
| 2022/0242747 A1* | 8/2022 | Liao ............... | C01G 53/50 |

OTHER PUBLICATIONS

Qian et al. Upcycling Low-Nickel Polycrystalline Cathodes from Retired Electric Vehicle Batteries into Single-Crystal Nickel-Rich Cathodes. https://doi.org/10.48550/arXiv.2108.03496 (Year: 2021).*
Ma et al. A universal etching method for synthesizing high-performance single crystal cathode materials. Nano Energy 87 /2021) 106194 (Year: 2021).*
Wang et al. Flux upcycling of spent NMC 111 to nickel-rich NMC cathodes in reciprocal ternary molten salts. iScience 25, 103801 (Year: 2022).*
Huang et al., "Preparation of single-crystal ternary cathode materials via recycling spent cathodes for high performance lithium-ion batteries," *Nanoscale* 2022, (14):9724-9735, plus Supplementary Information, 31 pages.

* cited by examiner

*Primary Examiner* — Tanisha Diggs
(74) *Attorney, Agent, or Firm* — Klarquist Sparkman, LLP

(57) ABSTRACT

A solid-state method for recycling spent and/or scrap cathode material includes heating a cathode material comprising lithium nickel manganese cobalt oxide in an oxygen-containing atmosphere at a temperature $T_1$ for an effective period of time $t_1$ to convert the cathode material to a solid precursor, combining the solid precursor with a lithium compound, and heating the solid precursor and the lithium compound in an oxygen-containing atmosphere at a temperature $T_2$ for an effective period of time $t_2$ to form a product comprising monocrystalline lithium nickel manganese cobalt oxide having a formula $LiNi_xMn_yM_zCo_{1-x-y-z}O_2$, where M represents one or more dopant metals, $x \geq 0.33$, $0.01 \leq y < 0.33$, $0 \leq z \leq 0.05$, and $x+y+z \leq 1.0$.

20 Claims, 8 Drawing Sheets

EXHIBIT A

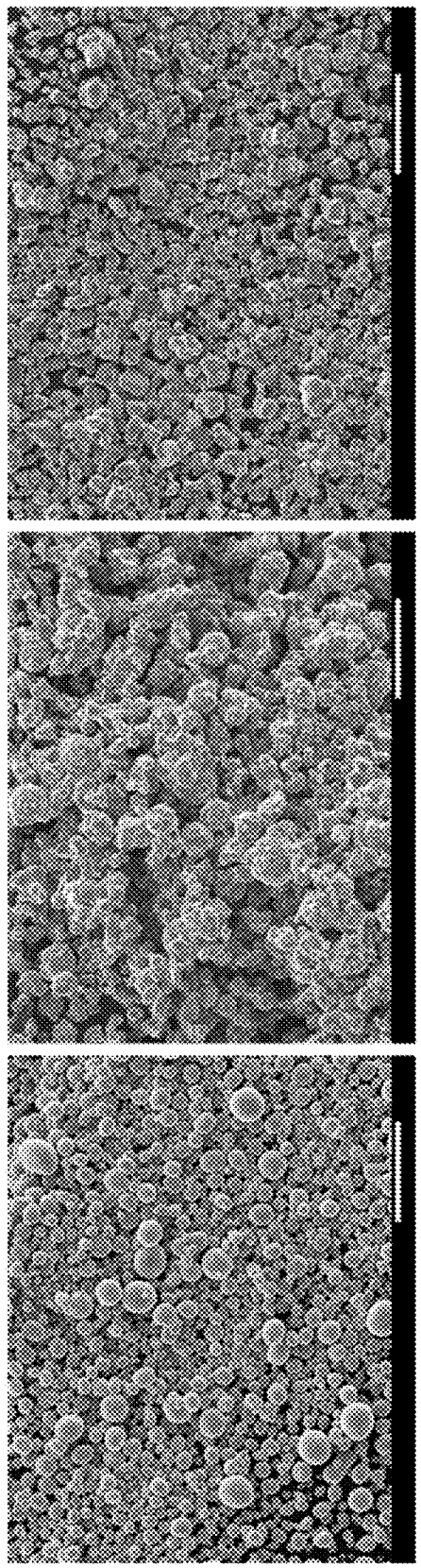
FIG. 8E
FIG. 8C
FIG. 8A
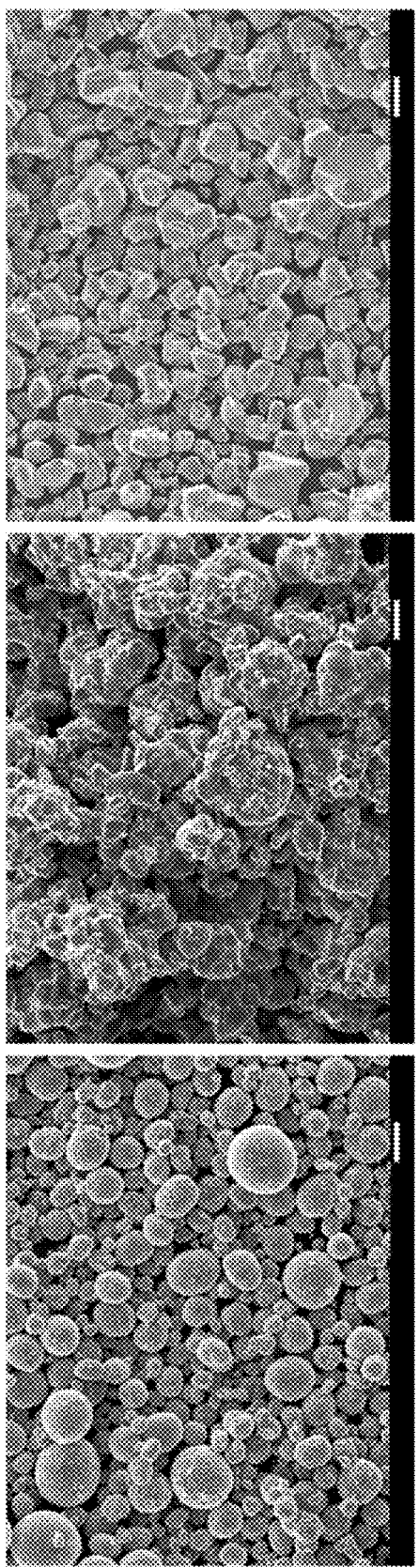
FIG. 8F
FIG. 8D
FIG. 8B

US 12,463,267 B2

DIRECT RECYCLING AND CONVERTING CATHODE MATERIALS INTO HIGH-PERFORMANCE SINGLE CRYSTAL CATHODE MATERIALS

ACKNOWLEDGMENT OF GOVERNMENT SUPPORT

This invention was made with government support under Contract DE-AC05-76RL01830 awarded by the U.S. Department of Energy. The government has certain rights in the invention.

FIELD

Methods of recycling spent and/or scrap lithium ion battery cathode materials to form recycled monocrystalline cathode materials are disclosed.

BACKGROUND

The increasing adoption of lithium ion batteries in consumer electronics, electric vehicles, and energy storage systems has created a great challenge for supply chain of raw resources, cobalt in particular, and industry sustainability. In addition, the accumulation of spent cathode materials poses a threat to the environment. All these pressing issues demand an efficient solution of cathode recycling.

In conventional hydrometallurgical processes, spent cathode materials are completely decomposed to their elemental components by using large amounts of acid and alkaline chemicals. Those elemental components are then used to remanufacture new cathode materials through typical cathode synthesis routes involving co-precipitation reactions (e.g., to form transition metal hydroxides) and final calcination with lithium salts. An energy-intensive molten salt process is also known, but produces toxic byproducts and corrosive waste. However, these hydrometallurgical and molten-salt processes are not only costly due to multiple steps, but also cause a risk of pollution to the environment amongst other hazards.

SUMMARY

Aspects of a solid-state method for recycling cathode materials are disclosed. In some aspects, the method includes heating a cathode material comprising lithium nickel manganese cobalt oxide in an oxygen-containing atmosphere at a temperature $T_1$ for an effective period of time $t_1$ to convert the cathode material to a solid precursor; combining the solid precursor with lithium compound in a Li:precursor molar ratio of from 0.1:1 to 1.5:1; and heating the solid precursor and the lithium compound in an oxygen-containing atmosphere at a temperature $T_2$ for an effective period of time $t_2$ to form a product comprising monocrystalline lithium nickel manganese cobalt oxide having a formula $LiNi_xMn_yM_zCo_{1-x-y-z}O_2$, where M represents one or more dopant metals, $x \geq 0.33$, $0.01 \leq y < 0.33$, $0 \leq z \leq 0.05$, and $x+y+z \leq 1.0$. In some implementations, the cathode material further comprises a binder, an additive, an electrolyte component, or any combination thereof, and heating the cathode material at the temperature $T_1$ in the oxygen-containing atmosphere for the effective period of time $t_1$ further removes the binder, the additive, the electrolyte component, or the combination thereof from the cathode material. In any of the foregoing or following aspects, the lithium compound may be $Li_2O$. In any of the foregoing or following aspects, the temperature $T_1$ may be 400° C. to 1000° C., and/or the effective period of time $t_1$ may be 1 hour to 30 hours. In some implementations, the temperature $T_1$ is 500° C. to 650° C., and/or the effective period of time $t_1$ is 15 hours to 25 hours.

In any of the foregoing or following aspects, the temperature $T_2$ may be 400° C. to 1000° C., and/or the effective period of time $t_2$ may be 1 hour to 30 hours. In some implementations, the temperature $T_2$ is 850° C. to 950° C., and/or the effective period of time $t_2$ is 5 hours to 15 hours.

In any of the foregoing or following aspects, the method may further include washing the product to remove excess lithium compound. In some aspects, the washed product is subsequently heated at a temperature $T_3$ for a period of time $t_3$. In some implementations, the temperature $T_3$ is 400° C. to 1000° C., and/or the effective period of time $t_3$ is 1 hour to 30 hours. In certain aspects, the temperature $T_3$ is 550° C. to 650° C., and/or the effective period of time $t_2$ is 2 hours to 6 hours.

In any of the foregoing aspects, the composition of the product NMC may be adjusted to differ from the composition of the cathode material. In one aspect, the cathode material comprises a mixture of lithium nickel manganese cobalt oxide obtained from two or more spent cathodes having different lithium nickel manganese cobalt oxide compositions, two or more scrap cathode materials having different lithium nickel manganese cobalt oxide compositions, or a combination of spent cathode and scrap cathode materials having different lithium nickel manganese cobalt oxide compositions. In an independent aspect, the composition is adjusted by combining the cathode material with one or more transition metal oxides, transition metal hydroxides, or any combination thereof prior to heating the cathode material at the temperature $T_1$. In another independent aspect, the composition is adjusted by combining the solid precursor and the lithium compound with one or more transition metal oxides, transition metal hydroxides, or any combination thereof prior to heating the solid precursor and the lithium compound at the temperature $T_2$.

The foregoing and other objects, features, and advantages of the disclosure will become more apparent from the following detailed description, which proceeds with reference to the accompanying figures.

BRIEF DESCRIPTION OF THE DRAWINGS

FIGS. 8A-8F are SEM images of pristine NMC811 (FIGS. 8A, 8B), pristine NMC811 after heat treatment in $O_2$ (FIGS. 8C, 8D), and recycled single crystalline NMC811 (FIGS. 8E, 8F), wherein the scale bar=50 µm (for FIGS. 8A, 8C, 8E) and 10 µm (for FIGS. 8B, 8D, 8F).

DETAILED DESCRIPTION

Figures 1A, 1B, 1C:
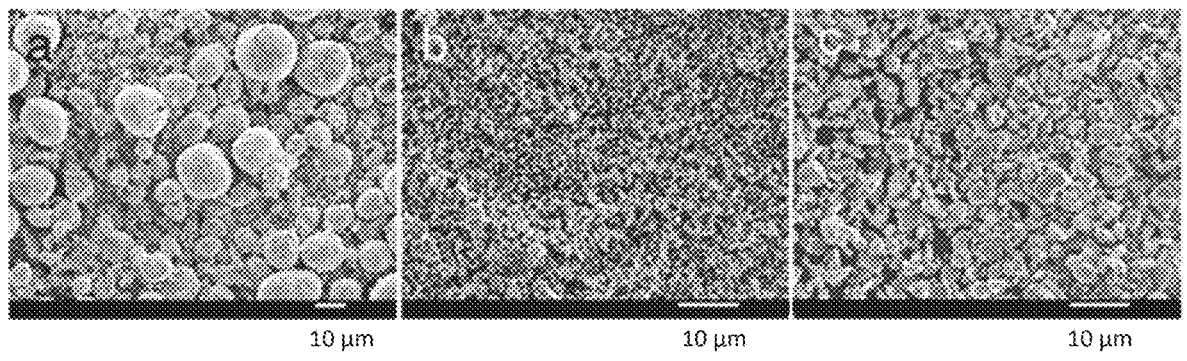
FIGS. 1A-1C are scanning electron microscopy (SEM) images of spent NMC (FIG. 1A), milled spent NMC (FIG. 1B), and recycled single crystalline NMC (FIG. 1C), wherein the scale bar=10 μm.

Aspects of a solid-state method for recycling cathode materials are disclosed.

Compared to conventional hydrometallurgical processes, the disclosed method includes fewer steps, reduces risk to the environment, and/or reduces recycling costs.

I. DEFINITIONS AND ABBREVIATIONS

The following explanations of terms and abbreviations are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

The disclosure of numerical ranges should be understood as referring to each discrete point within the range, inclusive of endpoints, unless otherwise noted. Unless otherwise indicated, all numbers expressing quantities of components, molecular weights, percentages, temperatures, times, and so forth, as used in the specification or claims are to be understood as being modified by the term "about." Accordingly, unless otherwise implicitly or explicitly indicated, or unless the context is properly understood by a person of ordinary skill in the art to have a more definitive construction, the numerical parameters set forth are approximations that may depend on the desired properties sought and/or limits of detection under standard test conditions/methods as known to those of ordinary skill in the art. When directly and explicitly distinguishing embodiments from discussed prior art, the embodiment numbers are not approximates unless the word "about" is recited.

Although there are alternatives for various components, parameters, operating conditions, etc. set forth herein, that does not mean that those alternatives are necessarily equivalent and/or perform equally well. Nor does it mean that the alternatives are listed in a preferred order unless stated otherwise.

Definitions of common terms in chemistry may be found in Richard J. Lewis, Sr. (ed.), Hawley's Condensed Chemical Dictionary, published by John Wiley & Sons, Inc., 2016 (ISBN 978-1-118-13515-0).

In order to facilitate review of the various embodiments of the disclosure, the following explanations of specific terms are provided:

Capacity: The capacity of a battery is the amount of electrical charge a battery can deliver. The capacity is typically expressed in units of mAh, or Ah, and indicates the maximum constant current a battery can produce over a period of one hour. For example, a battery with a capacity of 100 mAh can deliver a current of 100 mA for one hour or a current of 5 mA for 20 hours.

Cathode: An electrode through which electric charge flows out of a polarized electrical device. From an electrochemical point of view, positively charged cations invariably move toward the cathode and/or negatively charged anions move away from it to balance the electrons arriving from external circuitry.

Monocrystalline: A material wherein individual particles are a single crystal.

Polycrystalline: A material wherein individual particles comprise many small, crystallites that are separated by grain boundaries and randomly oriented with respect to one another.

Precursor: A precursor participates in a chemical reaction to form another compound. As used herein, the term "precursor" refers to metal-containing compounds used to prepare lithium nickel manganese cobalt oxide and metal-doped lithium nickel manganese cobalt oxide.

Solid state: Composed of solid components. As defined herein, a solid-state synthesis proceeds with solid components directly without using sintering agents.

Specific capacity: A term that refers to capacity per unit of mass. Specific capacity may be expressed in units of mAh/g, and often is expressed as mAh/g carbon when referring to a carbon-based electrode in L/air batteries.

II. METHOD FOR RECYCLING CATHODE MATERIAL

Aspects of a solid-state method for recycling spent cathodes include calcining cathode material with one or more lithium compounds to form a recycled cathode material. In some aspects, the cathode material is obtained from a spent cathode that has been cycled through numerous cycles (e.g., tens, hundreds, or thousands of cycles) over a period of time. In other aspects, the cathode material is scrap cathode material that has not been cycled, but does not meet one or more specifications (e.g., compositional and/or particle size/form specifications) for a desired cathode material. In some aspects, the cathode material comprises lithium nickel manganese cobalt oxide (referred to herein as NMC), and the recycled cathode material comprises monocrystalline lithium nickel manganese cobalt oxide. In any of the foregoing or following aspects, the monocrystalline lithium nickel manganese cobalt oxide may have a mean particle size of 0.5 µm to 20 µm, 0.5 µm to 15 µm, 0.5 µm to 10 µm, 0.5 µm to 7 µm, 1 µm to 5 µm, or 1 µm to 3 µm. "Mean" particle size refers to the mathematical average size (e.g., as determined by the largest dimension) of a plurality of particles. The particle size may be determined by any suitable method, such as dynamic light scattering, electron microscopy, using a mesh sieve, and the like.

In some aspects, the cathode material is obtained from a spent cathode comprising NMC or from scrap NMC. In some implementations, the NMC, prior to use in a cell or battery, has a formula $LiNi_xMn_yM_zCo_{1-x-y-z}O_2$, where M represents one or more dopant metals, $x \geq 0.33$, $0.01 \leq y < 0.33$, $0 \leq z \leq 0.05$, and $x+y+z \leq 1.0$. Exemplary dopant metals M include Mg, Ti, Al, Zn, Fe, Zr, Sn, Sc, V, Cr, Fe, Cu, Ga, Y, Zr, Nb, Mo, Ru, Ta, W, Ir, or any combination thereof. In certain implementations, the NMC is devoid of dopant metals such that z is 0, and the cathode material comprises $LiNi_xMn_yCo_{1-x-y}O_2$. In any of the foregoing or following aspects, the NMC may be a Ni-rich NMC, where x≥0.6, y is 0.1-0.2, and z is 0-0.05. A person of ordinary skill in the art understands that the spent or scrap NMC may be delithiated or deficient in lithium. The cathode material may further comprise a binder, an additive, an electrolyte component, or any combination thereof.

Aspects of the disclosed solid-state method comprise (i) heating a cathode material comprising NMC in an oxygen-containing atmosphere at a temperature $T_1$ for an effective period of time $t_1$ to convert the cathode material to a solid precursor, (ii) combining the solid precursor with a lithium compound; and (iii) heating the solid precursor and the lithium compound in an oxygen-containing atmosphere at a temperature $T_2$ for an effective period of time $t_2$ to form a product comprising monocrystalline NMC. In any of the foregoing or following embodiments, the oxygen-containing atmosphere may be air or pure oxygen. In some embodiments, the oxygen-containing atmosphere is pure oxygen. In some aspects, the solid precursor comprises transition metal oxides (e.g., oxides of Ni, Mn, Co, and any dopant metals). In certain aspects, the solid precursor further comprises lithium.

The cathode material to be recycled may be obtained by any suitable means. In some aspects, a cell comprising a spent cathode is disassembled, the cathode is removed, and the spent cathode material is removed from the current collector. In some aspects, scrap cathode material is cathode material that fails to meet one or more desired specifications, e.g., composition specifications and/or physical (such as particle size, crystalline form) specifications. In any of the foregoing or following aspects, it may be desirable to adjust the composition of the recycled NMC product formed from the cathode material. Advantageously, aspects of the disclosed method can be used to vary the product NMC composition. In one implementation, the product composition is controlled by selection of the cathode material(s). For instance, NMC from spent cathodes and/or scrap cathode material of differing compositions may be mixed in varying proportions. As one non-limiting example, NMC811 and NMC622 may be mixed in a molar ratio of 1:1 to provide NMC7/1.5/1.5. In another implementation, the NMC may be combined with suitable amounts of one or more transition metal oxides (TMO) and/or transition metal hydroxides (TMOH) to adjust the composition and provide a product with values of x, y, and/or z that differ from the original cathode material. For instance, the NMC may be combined with any desired combination of hydroxides and/or oxides of nickel, manganese, and/or cobalt. If desired, one or more dopants also can be added to the NMC in the form of hydroxides and/or oxides to further tailor the product composition.

The cathode material, and any added TMO/TMOH, is heated in an oxygen-containing atmosphere at the temperature $T_1$ for an effective period of time $t_1$ to convert the cathode material to a solid precursor. Heating at the temperature $T_1$ for the effective period of time $t_1$ also may remove any binder, additive, electrolyte component, or combination thereof from the cathode material. In some aspects, the temperature $T_1$ is 400° C. to 1000° C., such as a temperature in a range having endpoints selected from 400° C., 450° C., 500° C., 550° C., 600° C., 650° C., 700° C., 750° C., 800° C., 850° C., 900° C., 950° C., or 1000° C., for example 450° C. to 1000° C., 500° C. to 950° C., 500° C. to 750° C., 500° C. to 750° C., 550° C. to 650° C., 500° C. to 1000° C., 600° C. to 1000° C., 700° C. to 1000° C., 800° C. to 1000° C., or 900° C. to 1000° C. In any of the foregoing or following aspects, the time $t_1$ may be 1 hour to 30 hours, such as a time $t_1$ in a range having endpoints selected from 1 hour, 5 hours, 10 hours, 15 hours, 20 hours, 25 hours, or 30 hours, for example, 5 hours to 30 hours, 10 hours to 30 hours, or 15 hours to 25 hours. In some implementations, the temperature $T_1$ is 550° C. to 650° C., or the time $t_1$ is 15 hours to 25 hours, or the temperature $T_1$ is 900° C. to 1000° C. and the effective period of time $t_1$ is 15 hours to 25 hours. In a working example, the temperature $T_1$ was 580° C. and the time $t_1$ was 20 hours. In another working example, the temperature $T_1$ was 950° C. and the time $t_1$ was 15 hours.

The solid precursor formed by heating the cathode material at the temperature $T_1$ for the period of time $t_1$ is combined with a lithium compound. Suitable lithium compounds include, but are not limited to lithium oxide, lithium hydroxide, lithium carbonate, lithium nitrate, lithium peroxide, lithium acetate, lithium oxalate, or combinations thereof. The solid precursor may be combined with the lithium compound in a Li:precursor molar ratio of from 0.1:1 to 1.5:1. The molar ratio may be less than 1:1 in some aspects when the cathode material comprises at least some lithium. In some implementations, the Li:precursor molar ratio is in a range having endpoints selected from 0.1:1, 0.2:1, 0.3:1, 0.4:1, 0.5:1, 0.6:1, 0.7:1, 0.8:1, 0.9:1, 1:1, 1.05:1, 1.1:1, 1.2:1, 1.3:1, 1.4:1, or 1.5:1. Exemplary Li:precursor molar ratios are from 0.5:1 to 1.5:1, 0.7:1 to 1.5:1, 1:1 to 1.5:1, or 1.1:1 to 1.1:1.3. In some implementations, the lithium compound is $Li_2O$. In certain aspects, the $Li_2O$ has a mean particle size of less than or equal to 150 μm. For example, the $Li_2O$ may have a mean particle size of 10 μm to 150 μm or 10 μm to 100 μm. In some examples, the lithium compound is $Li_2O$, and the Li:precursor molar ratio is from 1.1:1 to 1.3:1. In any of the foregoing or following aspects, the composition may be adjusted by combining the solid precursor and the lithium compound with one or more transition metal oxides, transition metal hydroxides, or any combination thereof prior to heating the solid precursor and the lithium compound at the temperature $T_2$.

The combined solid precursor and lithium compound are heated in an oxygen-containing atmosphere at a temperature $T_2$ for an effective period of time $t_2$ to form a product comprising monocrystalline NMC having a formula $LiNi_xMn_yM_zCo_{1-x-y-z}O_2$, wherein M, x, y, and z are as previously described. In any of the foregoing or following aspects, the temperature $T_2$ may be 400° C. to 1000° C. In some aspects, the temperature $T_2$ is in a range having endpoints selected from 400° C., 450° C., 500° C., 550° C., 600° C., 650° C., 700° C., 750° C., 800° C., 850° C., 900° C., 950° C., or 1000° C., such as 500° C. to 1000° C., 600° C. to 1000° C., 700° C. to 1000° C., 800° C. to 1000° C., or 850° C. to 950° C. In any of the foregoing or following aspects, the time $t_2$ may be 1 hour to 30 hours, such as a time $t_2$ in a range having endpoints selected from 1 hour, hours, 10 hours, 15 hours, 20 hours, 25 hours, or 30 hours, such as 1 hour to 25 hours, 1 hour to 20 hours, 5 hours to 20 hours, or 5 hours to 15 hours. In some implementations, the temperature $T_2$ is 850° C. to 950° C., the effective period of time $t_2$ is 5 hours to 15 hours, or the temperature $T_2$ is 850° C. to 950° C. and the effective period of time $t_2$ is 5 hours to 15 hours. In some working examples, the temperature $T_2$ was 900° C. and the time $t_2$ was 10 hours.

In any of the foregoing or following aspects, the method may further comprise washing the product to remove excess lithium compound (e.g., excess $Li_2O$) and provide a washed product. The washed product may be heated a temperature $T_3$ for a period of time $t_3$ to provide a final dried product. Heating at the temperature $T_3$ may be performed in an oxygen-containing atmosphere. In some aspects, the temperature $T_3$ is 400° C. to 1000° C. In some aspects, the temperature $T_3$ is in a range having endpoints selected from 400° C., 450° C., 500° C., 550° C., 600° C., 650° C., 700° C., 750° C., 800° C., 850° C., 900° C., 950° C., or 1000° C., such as 450° C. to 1000° C., 500° C. to 950° C., 500° C. to 750° C., 500° C. to 750° C. or 550° C. to 650° C. In any of the foregoing or following aspects, the time $t_3$ may be 1 hour to 30 hours, such as a time $t_3$ in a range having endpoints selected from 1 hour, 2 hours, 3 hours, 4 hours, 5 hours, 6 hours, 10 hours, 15 hours, 20 hours, 25 hours, or 30 hours, such as a time of 1 hour to 25 hours, 1 hour to 20 hours, 1 hour to 15 hours, 1 hour to 10 hours, or 2 hours to 6 hours. In some implementations, the temperature $T_3$ is 550° C. to 650° C., or the time $t_3$ is 2 hours to 6 hours, or the temperature $T_3$ is 550° C. to 650° C. and the effective period of time $t_3$ is 2 hours to 6 hours. In a working example, the temperature $T_3$ was 580° C. and the time is was 4 hours. In some aspects, the washed product may be dried in an oven, such as a vacuum oven, at a temperature suitable to evaporate the washing solvent (e.g., water) prior to heating at the temperature $T_3$ for the period of time $t_3$.

In any of the foregoing or following aspects, the method may further include reducing a particle size of the solid precursor prior to combining the solid precursor with the lithium compound. In any of the foregoing or following aspects, the method may further include reducing a particle size of the cathode material prior to heating the cathode material at the temperature $T_1$. However, any particle size reduction is optional and may be omitted, thereby lowering overall energy costs and/or increasing production yield due to fewer processing steps.

Aspects of the disclosed solid-state recycling method offer many advantages over conventional hydrometallurgical recycling processes. The advantages can include, but are not limited to, eliminating the need for large amounts of acid or alkali, the ability to adjust the composition of the final product, reduced production cost, reduced energy usage, reduced production time, higher product yield, and combinations thereof. Additionally, aspects of the disclosed solid-state recycling method utilize less lithium compound (e.g., a Li:precursor molar ratio of 0.1:1 to 1.5:1) and/or create no byproducts, such as toxic gases or corrosive waste streams. Aspects of the disclosed solid-state recycling method produce monocrystalline NMC (see, e.g., FIGS. 1C, 5B, 6, and 8F). Advantageously, the X-ray diffraction (XRD) pattern of the recycled NMC is substantially the same as the XRD pattern of a corresponding pristine NMC (i.e., the peaks are located at the same 2 θ values, within experimental error, and the relative heights of the peaks in each XRD pattern are similar (±20%)), indicating that the recycled NMC has similar crystal structure.

The recycled cathode material is suitable for use in cathodes, such as lithium ion battery cathodes. In some aspects, the recycled monocrystalline NMC provides discharge capacities and coulombic efficiencies comparable with those of pristine monocrystalline NMC reported in the literature. In any of the foregoing or following aspects, the cathode may have a capacity ≥170 mAh/g. In some aspects, the cathode has a capacity ≥175 mAh/g, ≥180 mAh/g, ≥185 mAh/g, ≥190 mAh/g, or even ≥200 mAh/g. In any of the foregoing or following aspects, a lithium ion battery including a cathode comprising the recycled monocrystalline NMC may demonstrate an average coulombic efficiency of at least 80% over at least 50 cycles, such as 80-100%, 85-100%, 90-100%, or 95-100% over at least 50 cycles. In one example, a cell including a cathode comprising recycled NMC622 delivered a discharge capacity of 172 mAh/g and a first cycle coulombic efficiency of 85%. In another example, recycled NMC622 exhibited 89% capacity retention after 45 cycles. In still another example, a cell including a cathode comprising recycled NMC811 delivered a discharge capacity of 197 mAh/g and first cycle coulombic efficiency of 82%, in line with those of single crystalline NMC811 reported in literature.

III. EXAMPLES

Example 1

A cycled cell containing NMC622 as the cathode was disassembled and the cathode powder was collected. The spent cathode powder was calcined at 580° C. for 20 hours in an $O_2$ atmosphere to remove binder, electrolyte residue, and conductive additives. Then the powder was downsized to primary particles by ball milling. Afterwards the primary particles and $Li_2O$ powder with appropriate ratio were mixed by a roller mixer. The mixture was first calcined at 900° C. for 10 hours in an $O_2$ atmosphere. Then the product was washed with water, dried in vacuum oven, and then calcined at 580° C. for 4 hours in an $O_2$ atmosphere.

Figure 2:
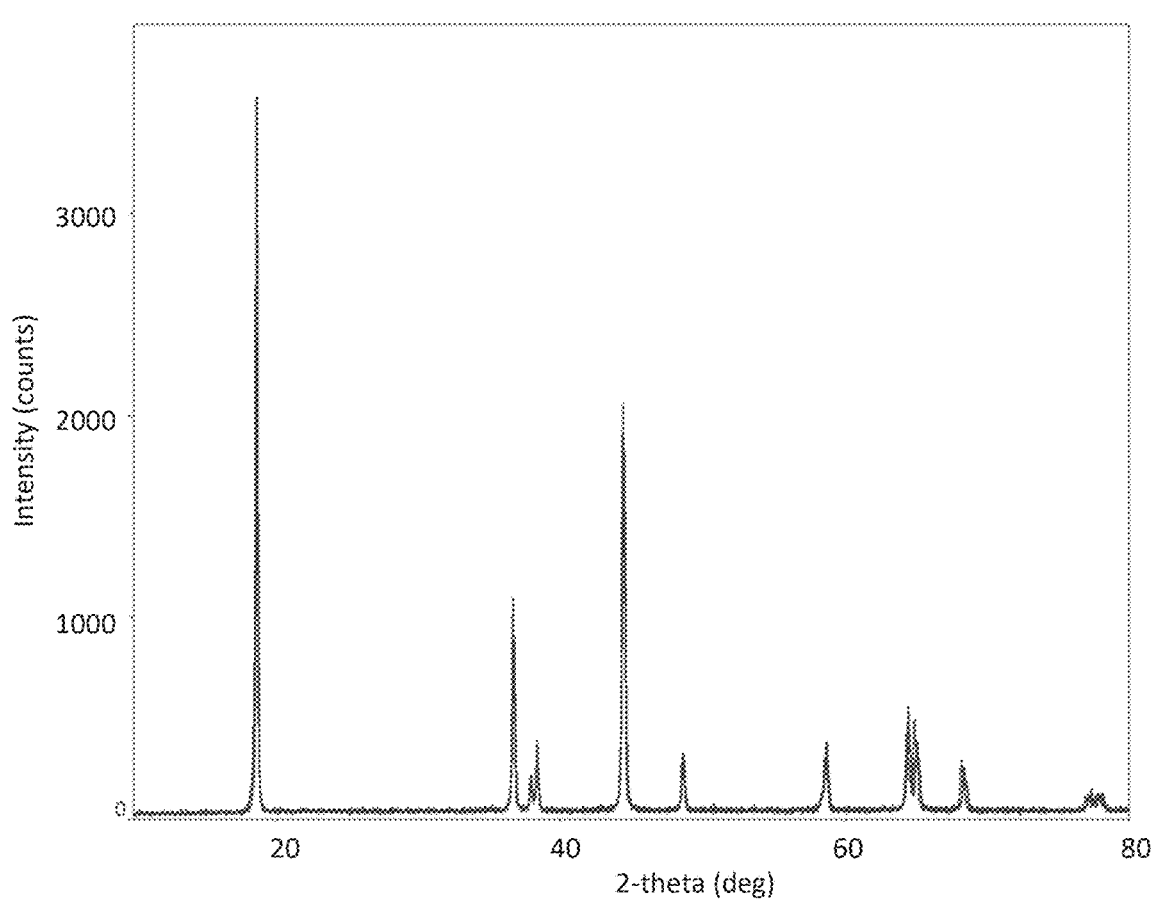
FIG. 2 shows the X-ray diffraction (XRD) spectra of pristine and recycled NMC.

FIGS. 1A-1C are scanning electron microscopy images of the spent NMC, milled spent NMC, and recycled single crystalline NMC, respectively. As shown in FIG. 1A, the spent cathode contains polycrystalline secondary particles and smaller primary particles formed during cycling and collecting. After ball milling, secondary particles were downsized to primary particles (FIG. 1B). The recycled NMC after reaction with $Li_2O$ was in the form of single crystals with particle sizes greater than 5 µm (FIG. 1C). Compared to the XRD pattern of pristine (uncycled) NMC (FIG. 2), the recycled product showed similar peaks. These data indicate the recycled NMC has a similar crystal structure to the pristine NMC.

Figure 3:
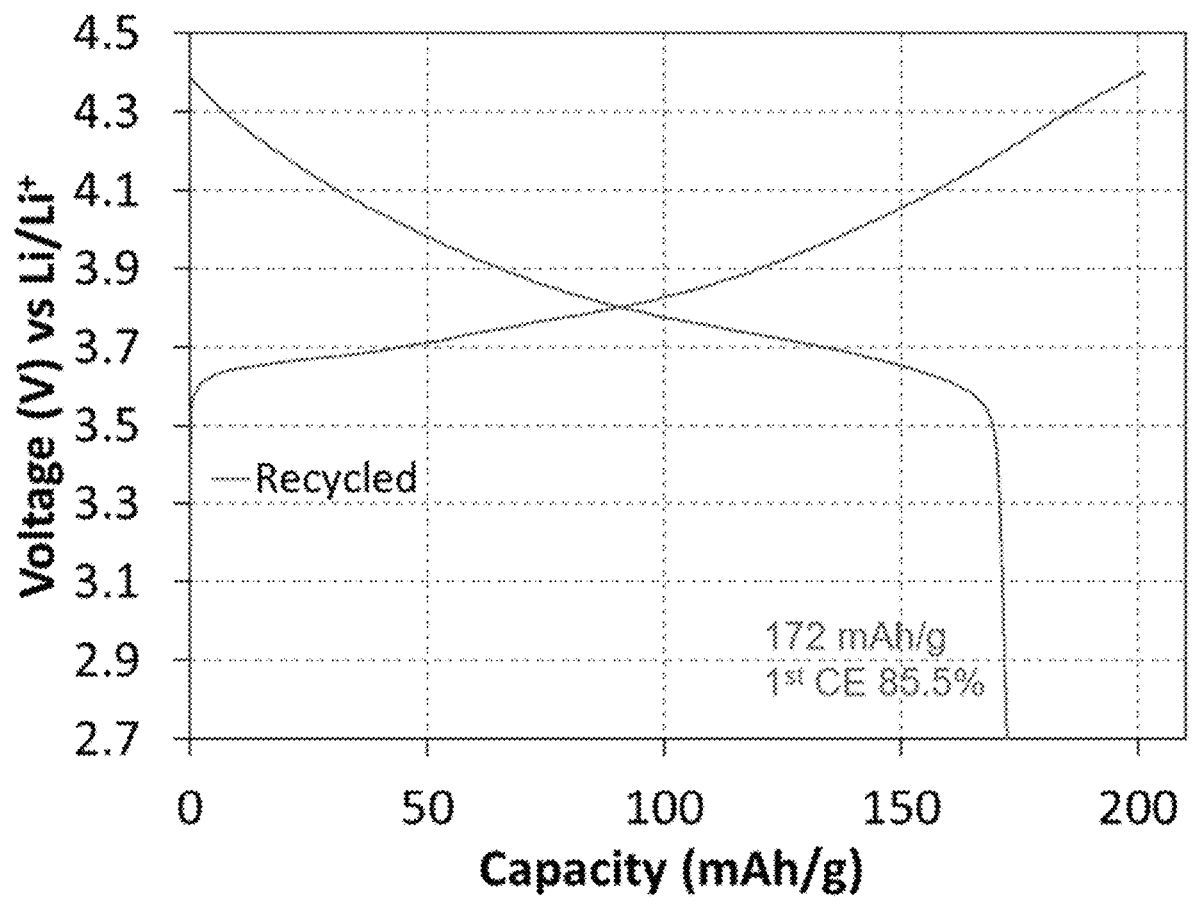
FIG. 3 shows first voltage profiles of the recycled NMC.

FIG. 3 shows $1^{st}$ voltage profiles of the recycled NMC. The recycled sample delivered a discharge capacity of 172 mAh/g and $1^{st}$ coulombic efficiency of 85.5%, in line with those of single crystalline NMC622 reported in literature.

Example 2

Figure 4A:
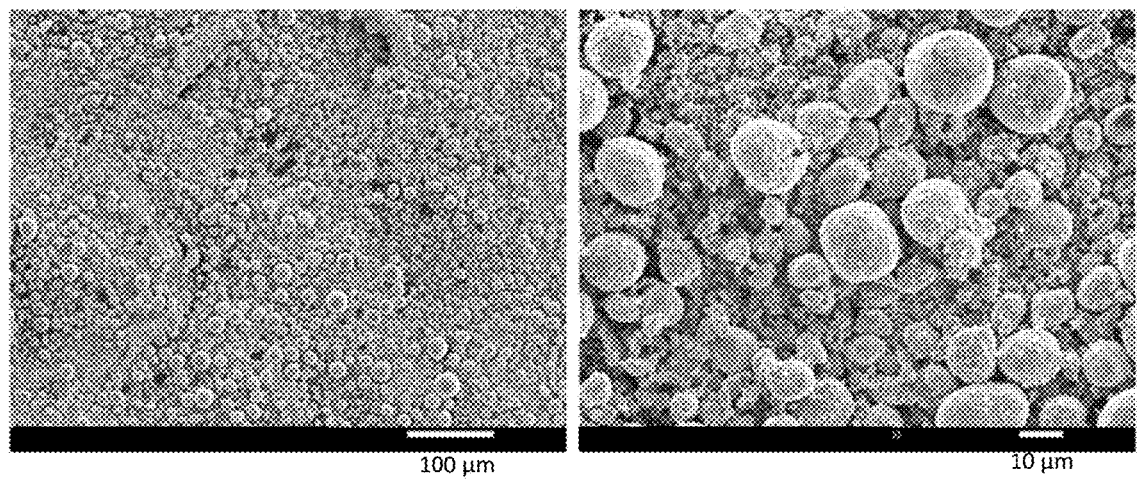
FIGS. 4A-4C are SEM images of spent NMC after calcining (FIG. 4A), subsequent blender milling (FIG. 48) and subsequent ball milling (FIG. 4C).
Figure 4B:
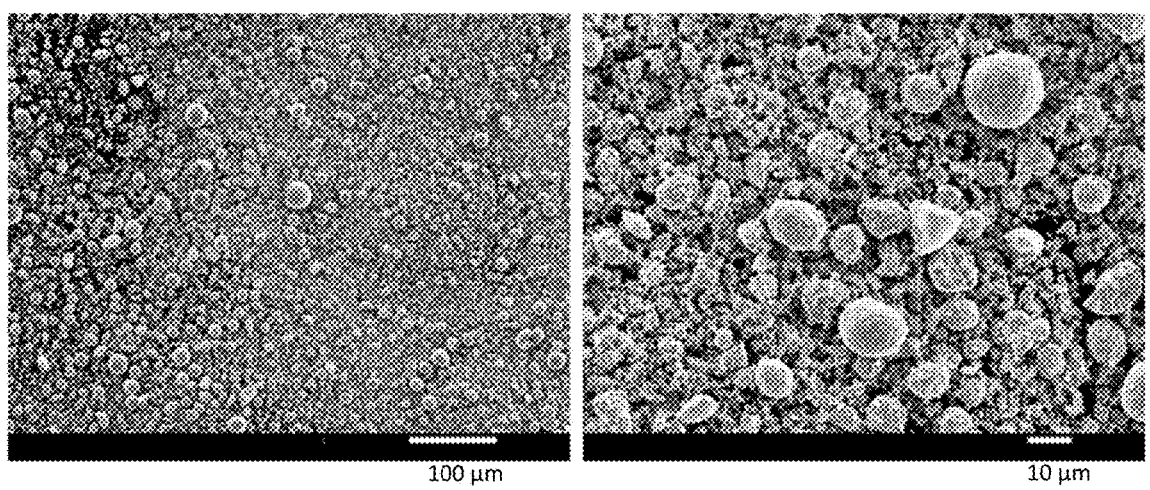
Figure 4C:
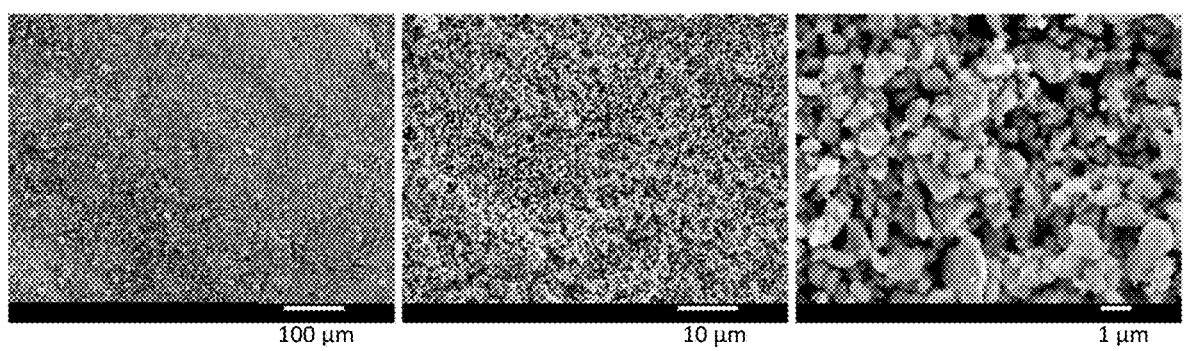

Spent NMC622, 10.2 g, was collected from a pouch cell. The spent NMC was calcined at 580° C. for 20 hours in an $O_2$ atmosphere to burn off binder, electrolyte residue, and conductive additives. Following calcination, 9.48 g (93 wt %) was recovered, which was close to the theoretical yield of 96 wt % based on the electrode formulation. FIGS. 4A and 4B are SEM images of the NMC after calcination (FIG. 4A) and after calcination plus blender milling (FIG. 4B). The images show that some particles were broken before milling (FIG. 4A), which may be due to mechanical degradation in the collection process. Blender milling did not further break the secondary particles (FIG. 4B). In contrast, subsequent ball milling broke down the majority of the secondary particles (FIG. 4C). The primary particles were 1 µm.

Figure 5A:
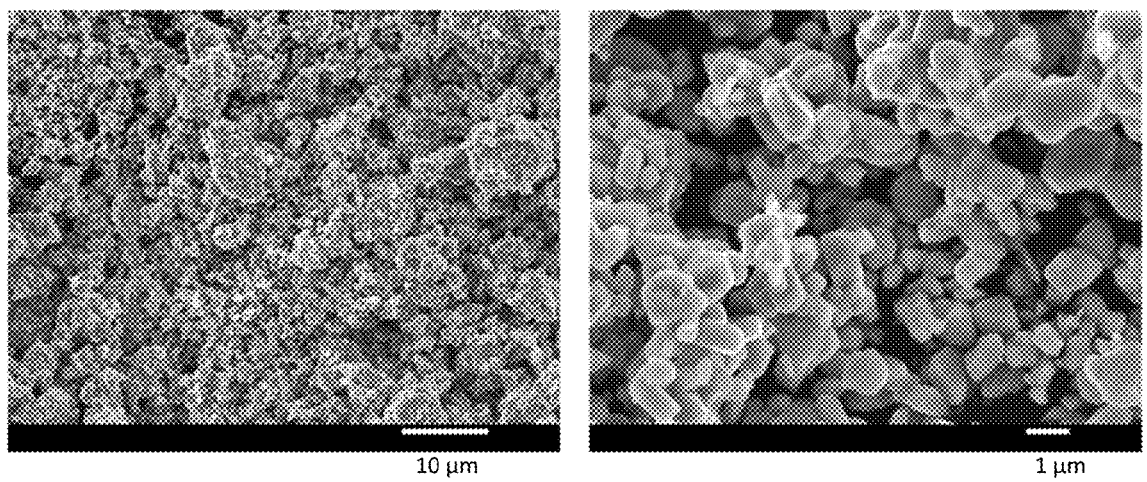
FIGS. 5A and 5B are SEM images of the spent NMC of FIG. 4C after subsequent calcination in the absence or presence of $Li_2O$, respectively.
Figure 5B:
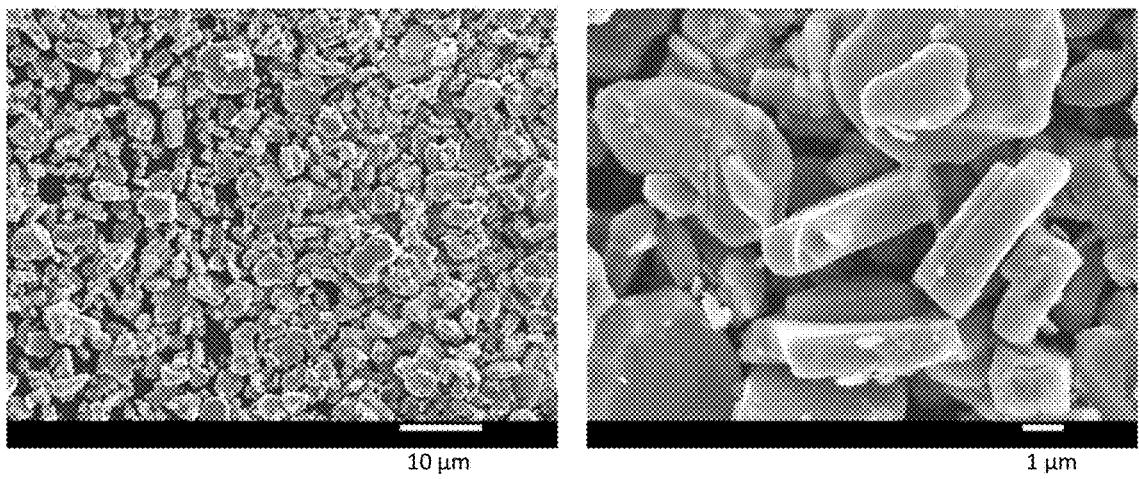
Figure 6:
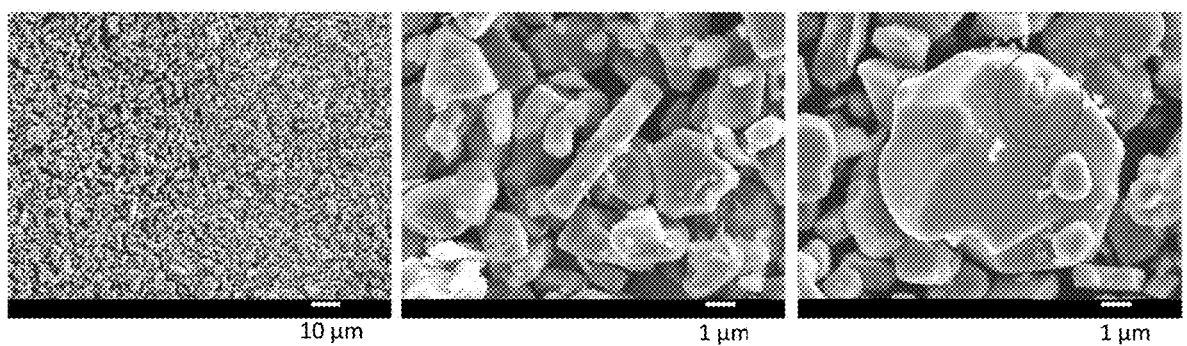
FIG. 6 shows additional SEM images of the spent NMC of FIG. 4C after subsequent calcination in the presence of $Li_2O$.

The recovered ball-milled particles were subsequently calcined at 900° C. for 10 hours in an $O_2$ atmosphere with or without $Li_2O$. In the absence of $Li_2O$, the particles agglomerated, but no significant crystal growth was observed (FIG. 5A). In the presence of $Li_2O$, segregated single crystals formed and significant crystal growth was seen (FIG. 5B, FIG. 6). As seen in FIGS. 5B and 6, the single crystals had a plate-like shape, and some evidence of potential Ostwald ripening was seen (circled feature).

Figure 7A:
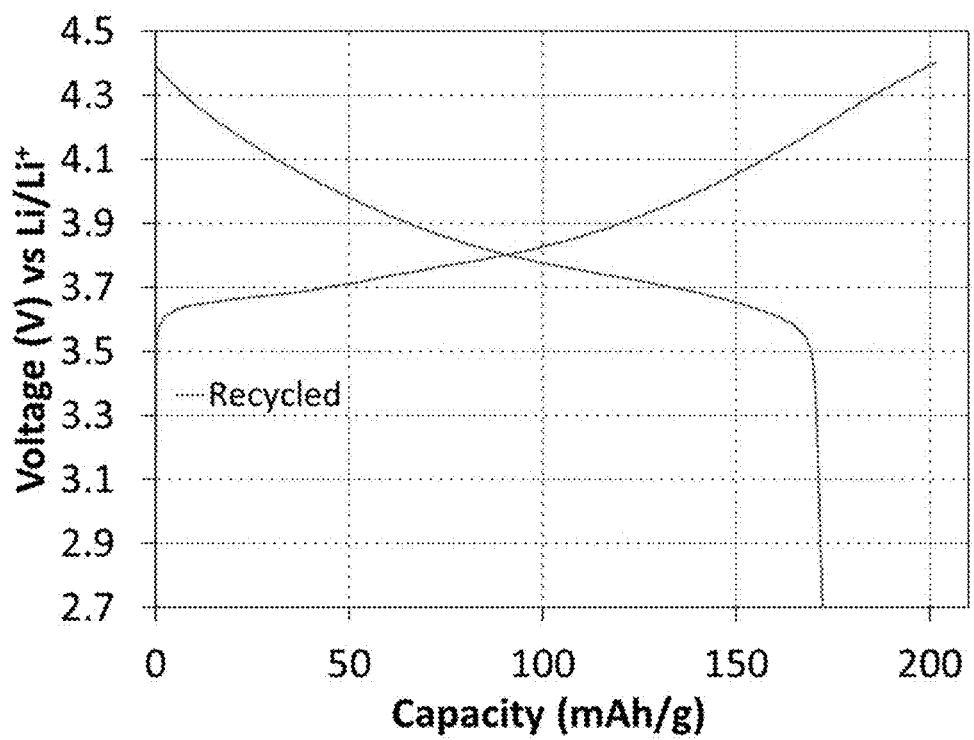
FIGS. 7A and 7B show the 1$^{st}$ voltage profiles of the recycled NMC of FIG. 6 (FIG. 7A) and the capacity retention with cycling (FIG. 78).
Figure 7B:
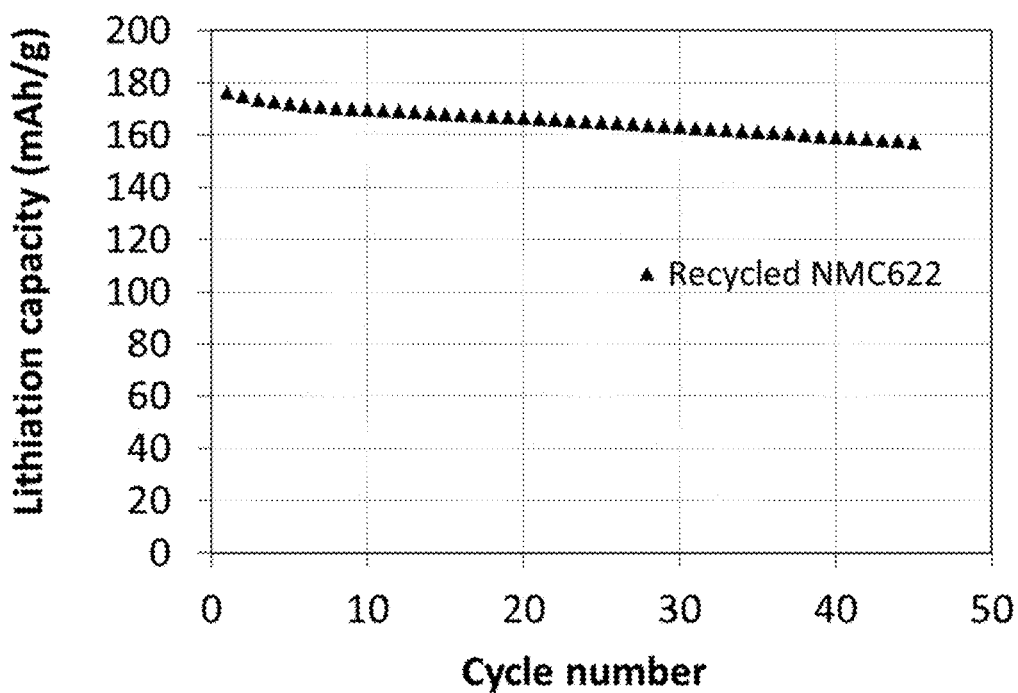

FIGS. 7A and 7B show the $1^{st}$ voltage profiles of the recycled NMC (FIG. 7A) and the capacity retention with cycling (FIG. 7B). As shown in FIG. 7B, the recycled cathode exhibited 89% capacity retention after 45 cycles.

Example 3

Figures 9A, 9B:
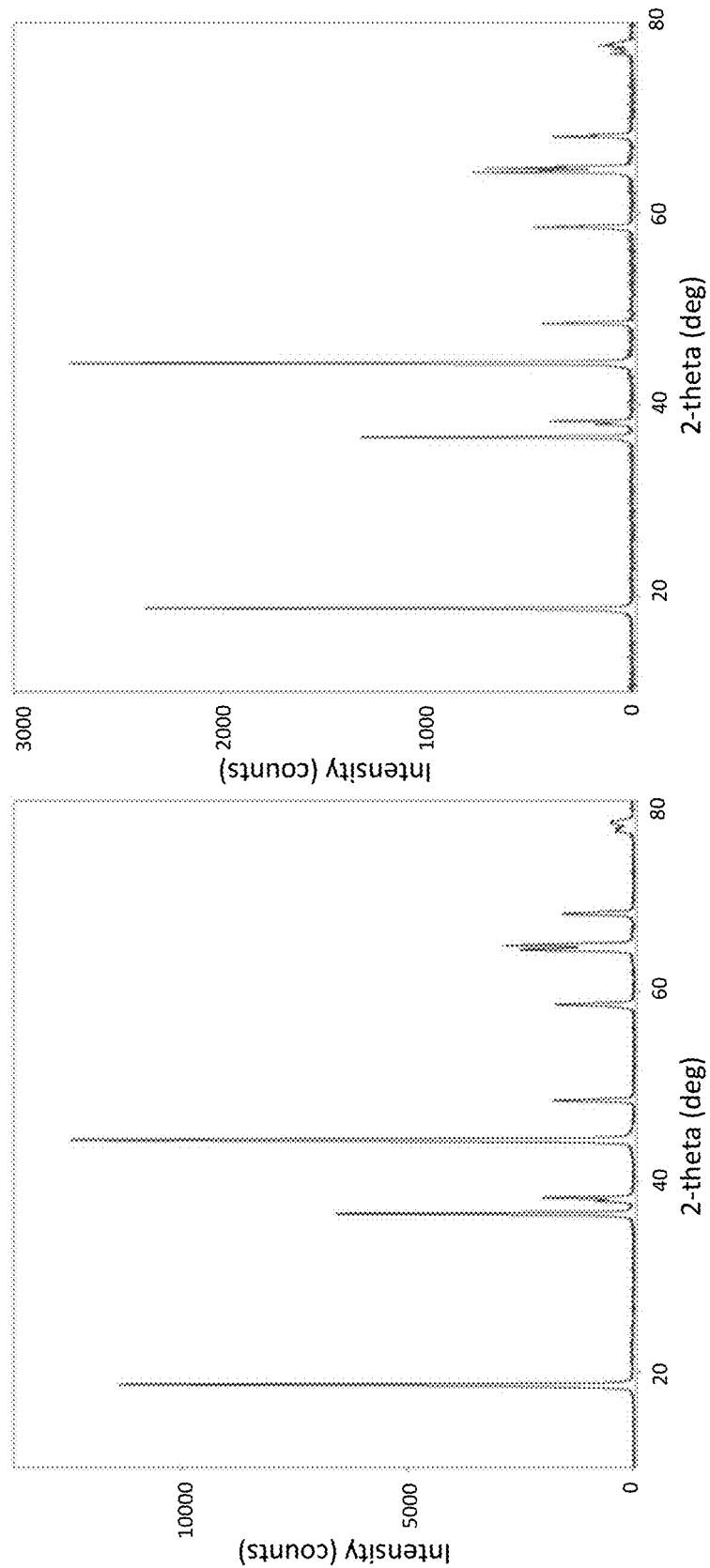
FIGS. 9A and 9B show XRD spectra of pristine and recycled NMC811.

An alternative recycling method without use of ball milling was also demonstrated. Scrap, uncycled polycrystalline NMC811 (FIGS. 8A, 8B) was heated at 950° C. for 15 hours in $O_2$ atmosphere to promote primary particle growth (FIGS. 8C, 8D). The shape of the original secondary particles changed as the primary particles grew, but the secondary particles remained agglomerated despite noticeable primary particle growth. Afterwards the agglomerated particles and $Li_2O$ powder with an appropriate ratio were mixed by a roller mixer. The mixture was first calcined at 900° C. for 10 hours in $O_2$ atmosphere. Then the product was washed with water, dried in a vacuum oven, and calcined 580° C. for 4 hours in $O_2$ atmosphere. It is clear that single crystals formed after treatment with $Li_2O$ (FIGS. 8E, 8F). FIGS. 9A and 9B are XRD patterns of the pristine polycrystalline NMC811 (FIG. 9A) and the recycled single crystalline NMC811 (FIG. 9B). No noticeable differences were observed.

Figure 10:
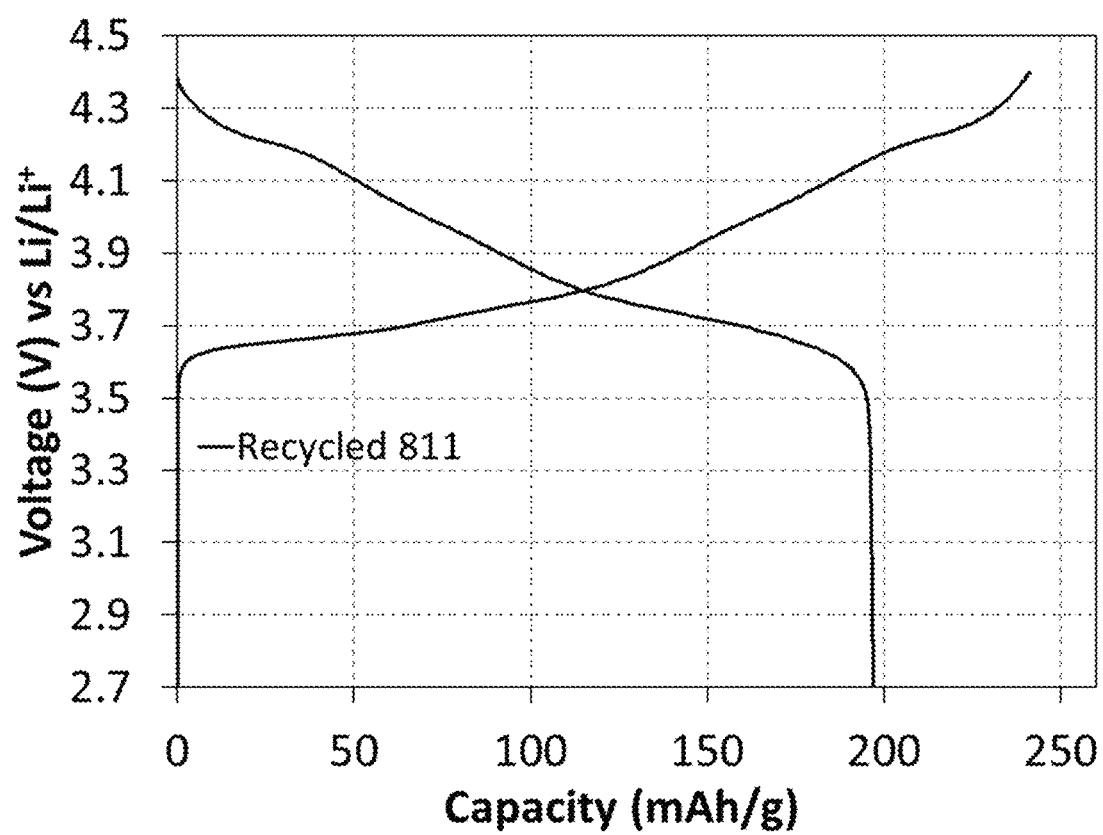
FIG. 10 shows the first voltage profiles of the recycled NMC of FIG. 8C.

FIG. 10 shows the first voltage profiles of the recycled NMC811. The recycled sample delivered a discharge capacity of 197 mAh/g and $1^{st}$ cycle coulombic efficiency of 82%, in line with those of single crystalline NMC811 reported in literature. In this example, ball milling could be omitted, which can facilitate lowering the overall energy cost and increase production yield due to fewer processing steps.

In view of the many possible embodiments to which the principles of the present disclosure may be applied, it should be recognized that the illustrated embodiments are only preferred examples of the present disclosure and should not be taken as limiting the scope of the present disclosure. Rather, the scope is defined by the following claims. We therefore claim as our invention all that comes within the scope and spirit of these claims.

We claim:

1. A solid-state method for recycling a cathode material, comprising:
   (a) heating a cathode material comprising lithium nickel manganese cobalt oxide in an oxygen-containing atmosphere at a temperature $T_1$ of 400° C. to 1000° C. for an effective period of time $t_1$ to convert the cathode material to a solid precursor; and
   (b) converting the solid precursor to a product comprising monocrystalline lithium nickel manganese cobalt oxide, wherein converting the solid precursor to the product consists of steps (i) and (ii), wherein
   step (i) is mixing, without reducing particle size of the solid precursor, the solid precursor with a lithium compound at a Li: precursor molar ratio of from 0.1:1 to 1.5:1 to form a first mixture in a solid state, and
   step (ii) is heating the first mixture in the solid state in an oxygen-containing atmosphere at a temperature $T_2$ of 400° C. to 1000° C. for an effective period of time $t_2$ to form the product, the product having a formula $LiNi_xMn_yM_zCo_{1-x-y-z}O_2$, where M represents one or more dopant metals, $x \geq 0.33$, $0.01 \leq y < 0.33$, $0 \leq z \leq 0.05$, and $x+y+z \leq 1.0$.

2. The solid-state method of claim 1, wherein:
   $x \geq 0.6$;
   $y=0.1-0.2$; and
   $z=0-0.05$.

3. The solid-state method of claim 1, wherein the cathode material further comprises a binder, an additive, an electrolyte component, or any combination thereof, and heating the cathode material in the oxygen-containing atmosphere at the temperature $T_1$ for the effective period of time $t_1$ further removes the binder, the additive, the electrolyte component, or the combination thereof from the cathode material.

4. The solid-state method of claim 1, wherein:
   the effective period of time $t_1$ is 1 hour to 30 hours.

5. The solid-state method of claim 1, wherein:
   (i) the temperature $T_1$ is 550° C. to 650° C.; or
   (ii) the effective period of time $t_1$ is 15 hours to 25 hours; or
   (iii) both (i) and (ii).

6. The solid-state method of claim 1, wherein:
   the effective period of time $t_2$ is 1 hour to 30 hours.

7. The solid-state method of claim 1, wherein:
   (i) the temperature $T_2$ is 850° C. to 950° C.; or
   (ii) the effective period of time $t_2$ is 5 hours to 15 hours; or
   (iii) both (i) and (ii).

8. The solid-state method of claim 1, wherein the lithium compound is $Li_2O$.

9. The solid-state method of claim 8, wherein:
   (i) the $Li_2O$ has a mean particle size of less than or equal to 150 μm; or
   (ii) the Li: precursor molar ratio is from 1.1:1 to 1.3:1; or
   (iii) both (i) and (ii).

10. The solid-state method of claim 1, further comprising washing the product to remove excess lithium compound and provide a washed product.

11. The solid-state method of claim 10, further comprising heating the washed product at a temperature $T_3$ for a period of time $t_3$.

12. The solid-state method of claim 11, wherein:
    (i) the temperature $T_3$ is 400° C. to 1000° C.; or
    (ii) the effective period of time $t_3$ is 1 hour to 30 hours; or
    (iii) both (i) and (ii).

13. The solid-state method of claim 11, wherein:
    (i) the temperature $T_3$ is 550° C. to 650° C.; or
    (ii) the effective period of time $t_3$ is 2 hours to 6 hours; or
    (iii) both (i) and (ii).

14. The solid-state method of claim 1, wherein $z=0$, and the monocrystalline lithium nickel manganese cobalt oxide has a formula $LiNi_xMn_yCo_{1-x-y}O_2$.

15. The solid-state method of claim 1, wherein the cathode material comprises one or more dopant metals M, where M comprises Mg, $T_1$, Al, Zn, Fe, Zr, Sn, Sc, V, Cr, Fe, Cu, Ga, Y, Zr, Nb, Mo, Ru, Ta, W, Ir, or any combination thereof.

16. The solid-state method of claim 1, wherein the cathode material comprises a mixture of lithium nickel manganese cobalt oxide obtained from two or more spent cathodes having different lithium nickel manganese cobalt oxide compositions, two or more scrap cathode materials having different lithium nickel manganese cobalt oxide compositions, or a combination of spent cathode and scrap cathode materials having different lithium nickel manganese cobalt oxide compositions.

17. The solid-state method of claim 1, further comprising:
    (i) disassembling a cell comprising a spent cathode, the cathode comprising the cathode material and a current collector;

(ii) removing the cathode material from the current collector; and (iii) then performing step (a).

18. A solid-state method for recycling a cathode material, comprising:

(a) heating a cathode material comprising lithium nickel manganese cobalt oxide, and optionally one or more transition metal oxides, transition metal hydroxides, or any combination thereof, in an oxygen-containing atmosphere at a temperature $T_1$ of 400° C. to 1000° C. for an effective period of time $t_1$ to convert the cathode material, and the optional one or more transition metal oxides, transition metal hydroxides, or any combination thereof, to a solid precursor; and (b) converting the solid precursor to a product comprising monocrystalline lithium nickel manganese cobalt oxide, wherein converting the solid precursor to the product consists of steps (i) and (ii), wherein step (i) is mixing, without reducing particle size of the solid precursor, the solid precursor with (a) a lithium compound at a Li: precursor molar ratio of from 0.1:1 to 1.5:1, and (b) optionally one or more transition metal oxides, transition metal hydroxides, or any combination thereof, to form a first mixture in a solid state, and step (ii) is heating the first mixture in the solid state in an oxygen-containing atmosphere at a temperature $T_2$ of 400° C. to 1000° C. for an effective period of time $t_2$ to form a product comprising monocrystalline lithium nickel manganese cobalt oxide having a formula $LiNi_xMn_yM_zCo_{1-x-y-z}O_2$, where M represents one or more dopant metals, $x \geq 0.33$, $0.01 \leq y < 0.33$, $0 \leq z \leq 0.05$, and $x+y+z \leq 1.0$.

19. A method for recycling cathode material, comprising: performing solid-state steps of heating a cathode material comprising lithium nickel manganese cobalt oxide in an oxygen-containing atmosphere at a temperature $T_1$ of 400° C. to 1000° C. for a time $t_1$ of 1 hour to 30 hours to convert the cathode material to a solid precursor; and converting the solid precursor to a product comprising monocrystalline lithium nickel manganese cobalt oxide, wherein converting the solid precursor to the product consists of steps (i) and (ii), wherein step (i) is mixing, without reducing particle size of the solid precursor, the solid precursor with $Li_2O$ at a Li: precursor molar ratio of from 0.1:1 to 1.5:1, and step (ii) is heating the solid precursor and the $Li_2O$ in an oxygen-containing atmosphere at a temperature $T_2$ of 400° C. to 1000° C. for a time $t_2$ of 1 hour to 30 hours to form the product, the product having a formula $LiNi_xMn_yM_zCo_{1-x-y-z}O_2$, where M represents one or more dopant metals, $x \geq 0.33$, $0.01 \leq y < 0.33$, $0 \leq z \leq 0.05$, and $x+y+z \leq 1.0$.

20. The method of claim 19, wherein $T_1$ is 550° C. to 650° C., $t_1$ is 15 hours to 25 hours, $T_2$ is 850° C. to 950° C., $t_2$ is 5 hours to 15 hours, and the Li: precursor molar ratio is from 1:1 to 1.3:1.

* * * * *